(12) United States Patent
Strom et al.

(10) Patent No.: US 7,569,088 B2
(45) Date of Patent: Aug. 4, 2009

(54) METHOD AND APPARATUS FOR CIRCULATING AIR THROUGH A HARD DISK DRIVE

(75) Inventors: Brian Strom, Cupertino, CA (US); Andrei Khurshudov, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 349 days.

(21) Appl. No.: 11/417,760

(22) Filed: May 3, 2006

(65) Prior Publication Data
US 2007/0256397 A1 Nov. 8, 2007

(51) Int. Cl.
*B01D 46/00* (2006.01)
(52) U.S. Cl. .................. 55/385.6; 96/134; 96/147; 96/154; 360/97.02
(58) Field of Classification Search .............. 55/385.6; 96/134, 147, 154; 360/97.02
See application file for complete search history.

(56) References Cited

U.S. PATENT DOCUMENTS

| | | | |
|---|---|---|---|
| 5,734,521 A * | 3/1998 | Fukudome et al. | 360/97.03 |
| 6,395,073 B1 * | 5/2002 | Dauber | 96/134 |
| 2003/0079450 A1 * | 5/2003 | Tomioka | 55/385.6 |
| 2004/0261378 A1 * | 12/2004 | Garikipati et al. | 55/385.6 |
| 2005/0092178 A1 * | 5/2005 | Lim et al. | 95/273 |
| 2006/0260283 A1 * | 11/2006 | Wei | 55/385.6 |
| 2007/0157588 A1 * | 7/2007 | Dauber et al. | 55/385.6 |
| 2007/0283809 A1 * | 12/2007 | Boulay et al. | 96/15 |

* cited by examiner

*Primary Examiner*—Jason M Greene
*Assistant Examiner*—Minh-Chau T Pham
(74) *Attorney, Agent, or Firm*—Earle Jennings; GSS Law Group

(57) ABSTRACT

Hard disk drive housing including at least one inlet, at least one outlet. The inlet is situated near spindle and above disk in hard disk drive. The outlet is situated near outside diameter of disk. When disk rotates, air pressure near the inlet is lower than air pressure near the outlet, causing a flow of air through the hard disk drive from the inlet to the outlet, tending to cool the hard disk drive. The inlet may include inlet filter. Outlet may include outlet filter. Manufacturing the housing by providing the inlet and the outlet. The disk cover as manufacturing product. Operating the hard disk drive containing the housing. The hard disk drive containing the housing, and manufacturing the hard disk drive. The hard disk drive as manufacturing product. A system containing at least one of the hard disk drives. Manufacturing the system, and the system as a manufacturing product.

33 Claims, 3 Drawing Sheets

METHOD AND APPARATUS FOR CIRCULATING AIR THROUGH A HARD DISK DRIVE

TECHNICAL FIELD

This invention relates to hard disk drive components, in particular, to mechanisms to regulate and control the internal ambient temperature inside a hard disk drive.

BACKGROUND OF THE INVENTION

A hard disk drive consumes power as part of its normal operation and much of this power is dissipated as heat. Like many electronic and mechanical devices, higher operating temperatures tend to compromise device reliability. A cooler hard disk drive tends to be more reliable. Several techniques have been developed to minimize the operating temperature of a hard disk drive.

A hard disk drive may be cooled by forced convection, where the air flow is provided by the host system. Some hard disk drives incorporate cooling fins as part of a casting used to make the disk base. This is sometimes done in hard disk drives when there is sufficient space, for instance, in a three and a half inch form factor with eighty five millimeter (mm) or sixty five mm disks.

Some hard disk drive configurations include a fan in the hard disk drive housing to provide flow for forced convection. Some external hard disk drive cases incorporate metal heat sinks that contact the hard disk drive housing and cool the hard disk drive through heat conduction.

Regardless whether convection or conduction is used, the heat generated in the prior art hard disk drive raises the temperature relative to the environment around the hard disk drive. The greater the heat generated, the greater the temperature differential needed for it to dissipate.

Today's hard disk drives gain a competitive advantage in certain markets by the effective use of power and effective methods for dissipating waste heat. By way of example, a home entertainment system may have an environment around the hard disk drive with a temperature exceeding sixty degrees Centigrade (° C.). Worse yet, such systems typically have no room for a cooling fan. What is needed are hard disk drives and their components minimizing the temperature difference between the hard disk drive internals and the environment, while doing so without requiring a fan.

SUMMARY OF THE INVENTION

The invention includes a housing for a hard disk drive that includes one or more inlets and one or more outlets, however in currently preferred embodiments described herein there is one of each. The inlet is located in an area of the hard disk drive, that during operation of the hard disk drive, is a low pressure area. The outlet is located in an area of the hard disk drive, that during operation of the hard disk drive, is a high pressure area. In the preferred embodiments, the motion of one or more disks in the hard disk drive is used to generate the high and low pressure regions. Thus, the hard disk drive is configured so that when the disk rotates, the air pressure near the inlet is lower than the air pressure near the outlet, causing a flow of air through the hard disk drive from the inlet to the outlet.

In some embodiments the inlet is preferably situated near the spindle and in other embodiments, more specifically above a disk in the hard disk drive. The outlet is preferably situated near the outside diameter of the disk, however, there may be other locations where the outlet could be functionally placed. The spindle couples with the disk to support rotating the disk in the hard disk drive. In order to cool the hard disk drive, the air flowing through the inlet is preferably cooler than the air space inside the hard disk drive.

The inlet and or the outlet may include filters to protect the hard disk drive from contaminants in the flow of air.

The invention includes manufacturing the disk housing with inlet and outlet. The disk cover is a product of the manufacturing process.

Providing the inlet and the outlet in the hard disk drive housing may include one or both of the following. Die-stamping a sheet of metal to create the inlet and/or the outlet. Casting to create the inlet and/or the outlet. In some embodiments inlet and the outlet are formed in the cover of the housing The manufacturing method for the disk cover may further include installing the inlet filter into the inlet and/or installing the outlet filter into the outlet.

The invention includes operating a hard disk drive including one or more air inlets and one or more air outlets that operates as follows: a spindle motor drives the spindle to rotate the disk, creating a rotating disk; the rotating disk generates a pressure field including a low pressure region near the inlet and a high pressure region near the outlet; the low pressure region induces air to flow through the inlet into the hard disk drive; the high pressure region induces air to flow through the outlet out of the hard disk drive.

In embodiments wherein the inlet and outlet are in the disk cover of the housing, the invention includes the hard disk drive containing the disk cover, and the method of manufacturing the hard disk drive by assembling the disk cover with the spindle motor coupled to the spindle further coupled to the disk. The inlet is situated near the spindle and above the disk. The outlet is situated near the outside diameter of the disk. The hard disk drive is a product of the manufacturing method.

The invention includes a system containing at least one of the hard disk drives. The system may operate above sixty degrees Centigrade. The system may be a home entertainment system.

DETAILED DESCRIPTION

This invention relates to hard disk drive components, in particular, to mechanisms to regulate and control the internal ambient temperature inside a hard disk drive. More specifically, the invention includes a housing for a hard disk drive that includes one or more inlets and one or more outlets. In the preferred embodiments, the motion of one or more disks in the hard disk drive is used to generate the high and low pressure regions. The hard disk drive is configured so that when the disk rotates, the air pressure near the inlet is lower than the air pressure near the outlet, causing a flow of air through the hard disk drive from the inlet to the outlet.

Figure 1A:
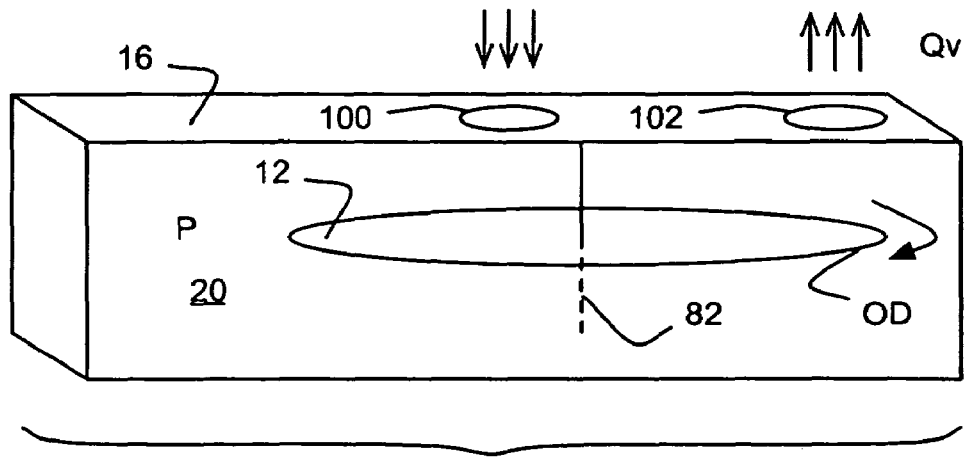
FIG. 1A shows the operation of the invention.
Figure 1B:
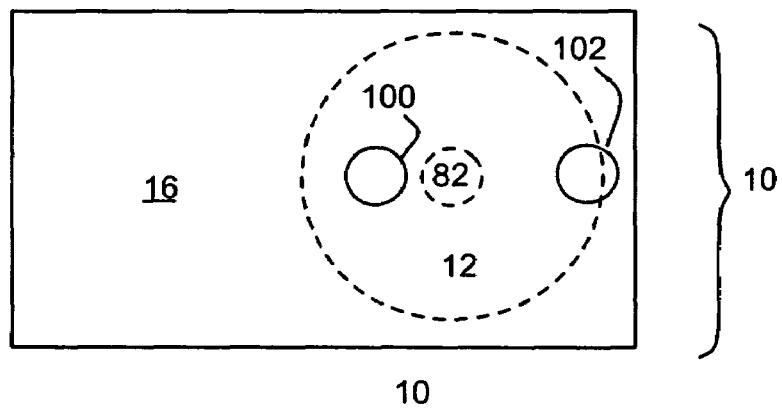
FIG. 1B shows a top view of a disk cover built in accord with the invention.
Figure 1C:
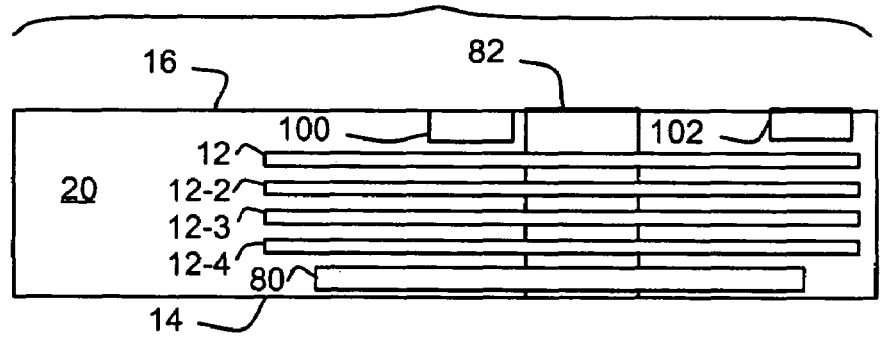
FIG. 1C shows further details on the internal components of a hard disk drive built in accord with the invention.

In one embodiment, the invention includes a disk cover 16 for a hard disk drive 10 as shown in FIGS. 1A to 1C (showing example embodiments of the invention). Alternative embodiments in which multiple inlets, multiple outlets, and situating at least one outlet in the disk base 14 are shown in FIGS. 3A to 3D. These will be discussed toward the end of the detailed description.

Referring to the example embodiments seen in FIGS. 1A-1B, the disk cover 16 includes an inlet 100 and an outlet 102. The inlet 100 is situated near the spindle 82 and above a disk 12 in the hard disk drive 10. The outlet 102 is situated near the outside diameter OD of the disk 12. The spindle 82 couples with the disk to support rotating the disk in the hard disk drive 10. When the disk 10 rotates, the air pressure near the inlet 100 is lower than the air pressure near the outlet 102, causing a flow of air through the hard disk drive 10 from the inlet 100 to the outlet 102. FIG. 1C shows an alternate embodiment including more than one disk (disks 12 through 12-4). In the embodiments seen in FIGS. 1A through 1C the inlet 100 and outlet 102 are formed in the cover of the housing 20. However, in alternate embodiments, the inlet and outlet may possibly be places elsewhere. Additionally, FIGS. 1A through 1C show just one each of inlet 100 and outlet 102. However, in alternate embodiments the number of inlets and/or outlets could be larger.

Figure 1D:
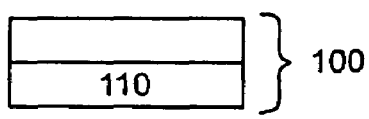
FIG. 1D shows the inlet of FIGS. 1A to 1C including an inlet filter.

The inlet 100 may include an inlet filter 110 to protect the hard disk drive 10 from contaminants in the flow of air, as shown in FIG. 1D. The inlet filter may preferably have low air flow impedance to protect the air space 20 of the hard disk drive from contaminants.

Figure 1E:
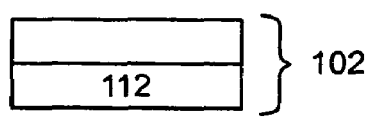
FIG. 1E shows the outlet of FIGS. 1A to 1C including an outlet filter.

The outlet 1-2 may include an outlet filter 112 to protect the hard disk drive 10 from contaminants in the flow of air, as shown in FIG. 1E. Preferably, the outlet filter may have a low air flow impedance filter to protect the air space 20 of the hard disk drive from contaminants.

The invention includes manufacturing the disk cover 16 including the inlet 100 and the outlet 102. The disk cover is a product of the manufacturing process. The disk cover may be cast or formed from sheet metal to provide the inlet and the outlet. The inlet may be circular as shown in FIG. 1C, elliptic, as in FIG. 2, or irregular in shape, which is not shown. Similarly, the outlet may be circular, elliptic, or irregular.

Methods for providing the inlet 100 and the outlet 102 may include one or both of the following. Die-stamping a sheet of metal to create the inlet and/or the outlet. Casting to create the inlet and/or the outlet.

The manufacturing method for the disk cover 16 may further include installing the inlet filter 110 into the inlet 100 and/or installing the outlet filter 112 into the outlet.

The invention includes operating the hard disk drive 10 containing the disk cover 16 as shown by example in FIGS. 1A to 1C. A spindle motor 80 drives the spindle 82 to rotate the disk 12, creating a rotating disk. The rotating disk generates a pressure field including a low pressure region near the inlet 100 and a high pressure region near the outlet 102. The low pressure region induces air to flow through the inlet into the hard disk drive. The high pressure region induces air to flow through the outlet out of the hard disk drive. The inlet is located near the spindle 82 coupling the disk 12 or disks included in the hard disk drive, and the outlet is located near the outside diameter OD of the disk. As previously stated, in alternate embodiments, the configuration of the inlets and outlets may be varied in number of apertures, the location of the apertures, and the shape of the apertures. As used herein, an aperture will refer to an inlet or an outlet.

The air flowing through the inlet 100 is preferably cooler than the air space inside the hard disk drive 10. Consequently, the rotating disk 12, through the pressure field previously discussed induces airflow in through the inlet 100 and out through the outlet 102. The air temperature outside the hard disk drive 10 is lower than the temperature inside the hard disk drive, and the airflow acts to export heat from hard disk drive, because cooler air is entering through the inlet and warmer air is leaving through the outlet.

By way of example, assume the hard disk drive 10 dissipates heat at an internal heat rate P, as shown in FIG. 1A. The internal heat rate results in a temperature increase relative to the ambient of $\Delta T$. To achieve a reduction of the temperature increase of $\Delta T/2$ requires the airflow to carry heat away at a rate of P/2. The airflow rate Qv may be determined from the following formula. The relationship between the internal heat rate, the temperature increase, and the airflow rate may be summarized as $$P/2 = C_P * \Delta T/2 * \rho * Qv \quad (0.1)$$

Where $\rho=0.001225$ grams (g) per cubic centimeter ($cm^3$) and Cp is 1 Joule (J)/g/° K. To further develop this example, assume that P is 5 watts and $\Delta T=20°$ K. Solving for the airflow rate yields Qv=204 $cm^3$/sec=0.4 $ft^3$/min, which is a feasible goal to reach.

The invention includes the hard disk drive containing the disk cover, and manufacturing the hard disk drive by assembling the disk cover with the spindle motor coupled to the spindle coupled to the disk. In currently preferred embodiments the inlet is situated near the spindle and above the disk, and the outlet is situated near the outside diameter of the disk. The hard disk drive is a product of the manufacturing method.

The invention includes the hard disk drive 10 including the disk cover 16 with the inlet 100 situated near the spindle 82 and the outlet 102 near the outside diameter OD of the disk 12. The disk couples through the spindle to the spindle motor 80 as shown in FIG. 1C. The hard disk drive preferably further includes a disk base 14 upon which the spindle motor is mounted with at least one disk coupling through the spindle. A voice coil motor 18 is mounted on the disk cover to rotate through a pivot to position a read-write head situated on an actuator arm over the rotating disk surface when the hard disk drive is in operation.

The hard disk drive 10 preferably performs at least a read access and a write access on data stored on at least one surface of the disk 12 as normal operations. These normal operations are the primary times when the hard disk drive dissipates heat. When the disk rotates the pressure field is generated as discussed above, which induces heat export via the airflow in through the inlet 100 and out through the outlet 102.

Figure 2:
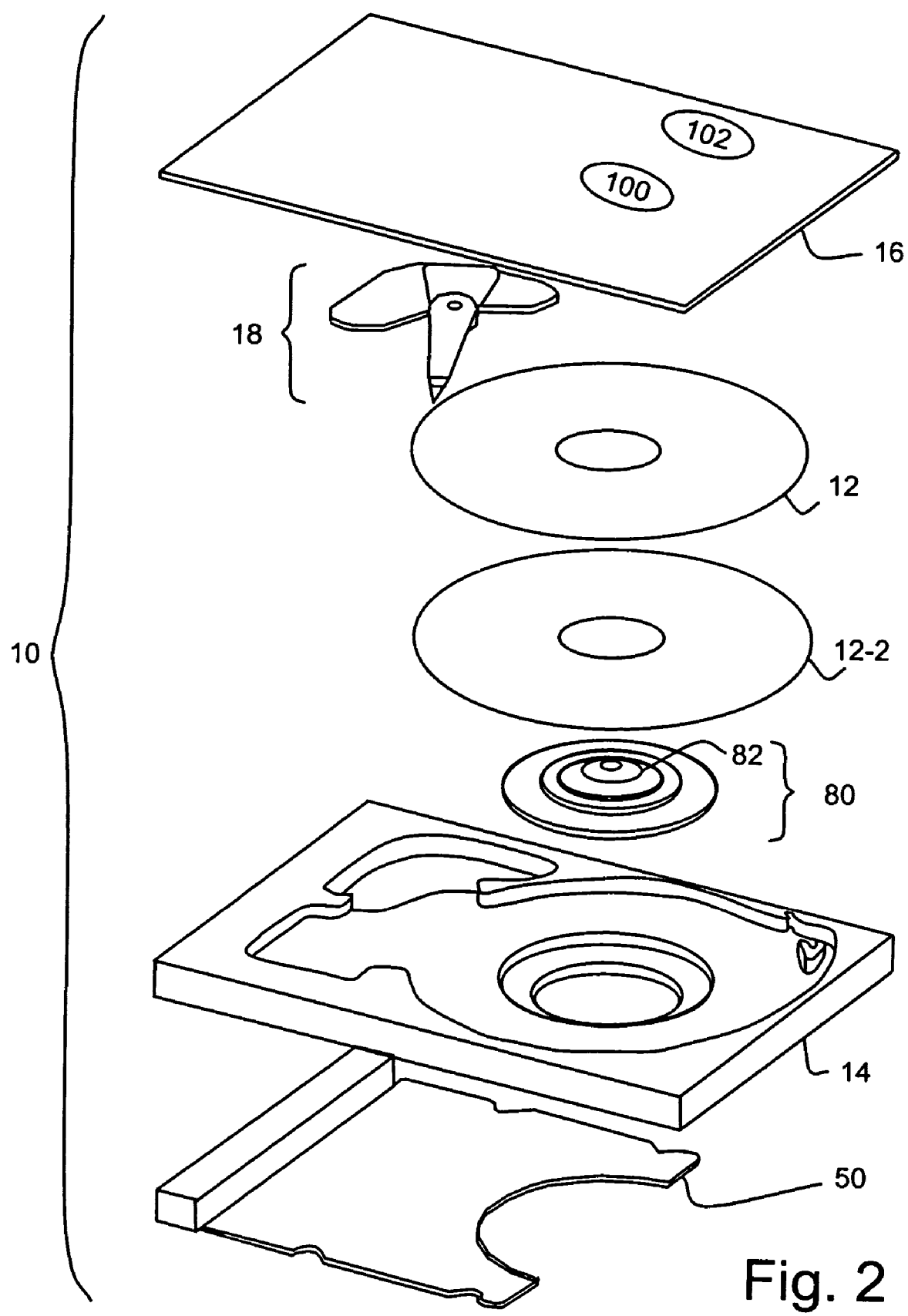
FIG. 2 shows an exploded view of a hard disk drive built in accord with the invention.

The hard disk drive 10 may further include an embedded circuit as shown in FIG. 2, which is electrically coupled to the voice coil motor 18 to control the positioning of the read-write head over the surface of the disk 12, as well as provide the interface between the storage medium of the disk surface, and a system using the hard disk drive.

The invention includes manufacturing the hard disk drive 10. The disk cover 16 is assembled with the spindle motor 80 coupled to the spindle 82 coupled to the disk 12. The assembly positions the disk cover with the inlet 100 situated near the spindle and the outlet 102 near the outside diameter OD of the disk. The spindle motor is mounted on the disk base 14. The voice coil motor 18 is mounted on the disk cover to rotate through a pivot to position a read-write head situated on an actuator arm over the rotating disk surface when the hard disk drive is in operation. The hard disk drive is a product of the manufacturing process.

The hard disk drive 10 may include more than the one disk 12 shown in FIGS. 1A and 1B. FIG. 2 shows the hard disk drive further including a second disk 12-2. FIG. 1C shows the hard disk drive further including a third disk 12-3 and a fourth disk 12-4.

The hard disk drive 10 may further limit heat consumption by limiting the heat generated by specific components within the hard disk drive. By way of example, the spindle motor 80 may be designed for efficiency and low power consumption. Another example, the voice coil motor 18 may be used at relatively low speeds in certain applications, which acts to conserve power and reduce heat consumption. Yet another example, certain electronics components may be turned off, or put in a standby mode, when not in use.

The invention includes a system containing at least one of the hard disk drives. The system may often operate above sixty degrees Centigrade. The system may be a home entertainment system.

Figure 1F:
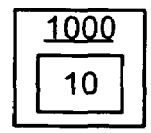
FIG. 1F shows a system including the hard disk drive of the invention.

The invention further includes a system 1000 including the hard disk drive 10 as shown in FIG. 1F. The system may be a home entertainment system. The system may often operate at a temperature of sixty degrees Centigrade (° C.) or above. The invention further including manufacturing the system using the hard disk drive. Using the hard disk drive may include mounting the disk base 14 to a slot, electrically coupling the embedded circuit 50 to a power supply cable and a communications cable, which may be a parallel digital cable or a serial cable, such as a Universal Serial Bus (USB) cable.

Figure 3A:
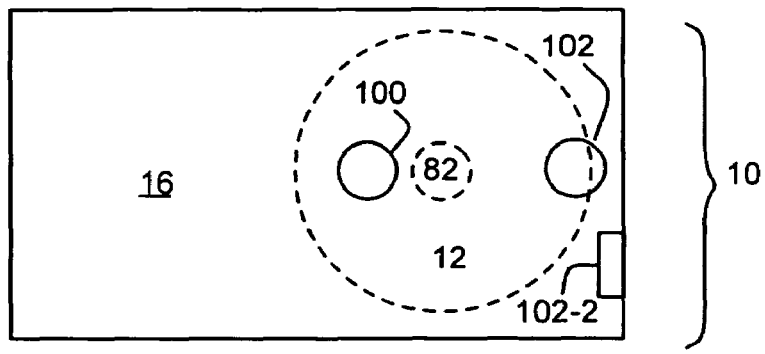
FIGS. 3A and 3C shows the hard disk drive including two outlets.
Figure 3B:
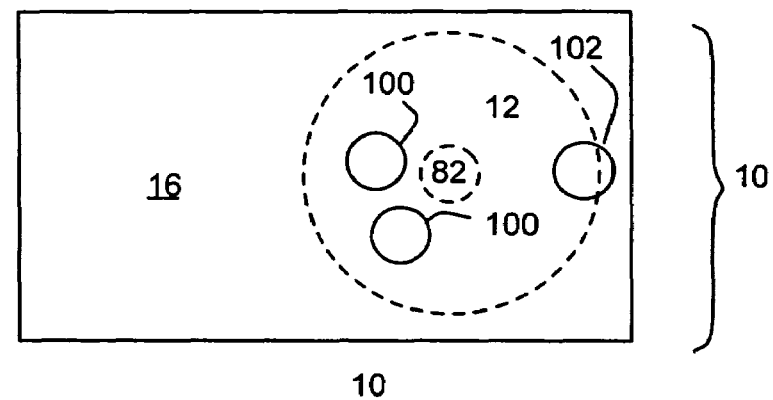
FIG. 3B shows the hard disk drive including two inlets.

Returning to several issues regarding the scope of the invention. The housing will preferably include a disk cover 16 and a disk base 14, but may be differently configured in alternate embodiments. In preferred embodiments, the inlet 100 may preferably be situated in the disk cover above at least one disk 12 and near the spindle 82, however, they may be other locations where the inlet may be functionally placed. In some embodiments the housing may include more than one inlet. FIG. 3B shows an example embodiment with two inlets. In some embodiments, the inlet may comprise a plurality of small holes grouped together.

Figure 3C:
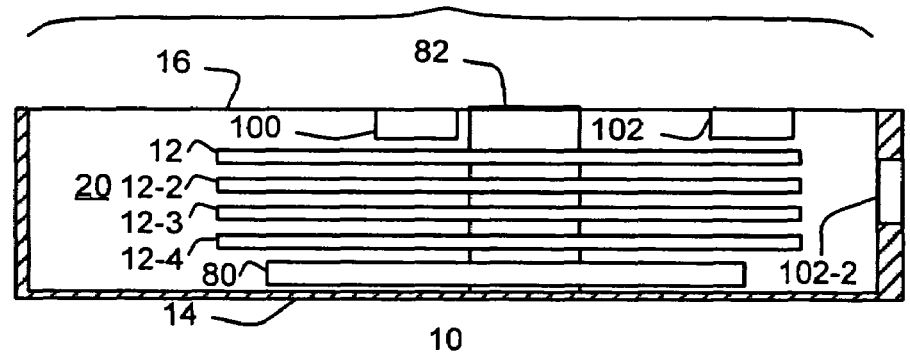
Figure 3D:
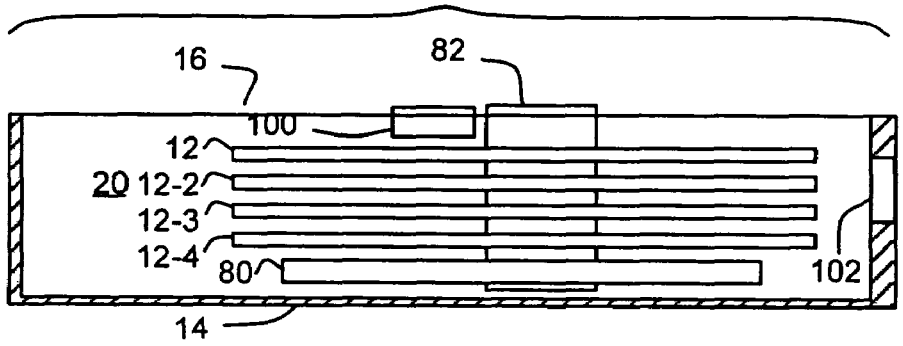
FIG. 3D shows the disk base including the outlet.

The outlet 102 is preferably situated near the outside diameter OD of the disk 12, but may be differently configured in alternate embodiments. In one preferred embodiment, the disk cover 16 may preferably include the outlet. Alternatively, the disk base 14 may include the outlet, as shown in FIG. 3D. The housing may include a second outlet 102-2 as shown in FIG. 3A and 3C. In some embodiments, the outlet may comprise a plurality of small holes grouped together.

The preceding embodiments provide examples of the invention and are not meant to constrain the scope of the following claims.

What is claimed is:

1. A disk cover for a hard disk drive, comprising:
   an inlet and an outlet situated to be above a disk with said inlet located near the spindle and said outlet located near the outside diameter of said disk; wherein said spindle couples with said disk to support rotating said disk in said hard disk drive;
   wherein when said disk rotates in said hard disk drive, the air pressure near said inlet is lower than said air pressure near said outlet, causing a flow of air from outside said hard disk drive into said inlet and through said hard disk drive to said outlet for flow out of said hard disk drive.

2. The disk cover of claim 1, wherein said inlet comprises an inlet filter to protect said hard disk drive from contaminants in said flow of said air.

3. The disk cover of claim 1, wherein said outlet comprises an outlet filter to protect said hard disk drive from contaminants in said flow of said air.

4. A method of manufacturing said disk cover of claim 1, comprising the step:
   providing said inlet and said outlet to create said disk cover.

5. The disk cover as a product of the process of claim 4.

6. A method of operating said hard disk drive including said disk cover of claim 1, comprising the steps:
   a spindle motor drives said spindle to rotate said disk to create a rotating disk;
   said rotating disk generates a pressure field including a low pressure region near said inlet and a high pressure region near said outlet;
   said low pressure region induces air to flow through said inlet into said hard disk drive; and
   said high pressure region induces air to flow through said outlet out of said hard disk drive.

7. The method of claim 6, wherein said air flowing through said inlet is cooler than a temperature of the air space in said hard disk drive.

8. The hard disk drive of claim 1, comprising:
   said disk cover with said inlet situated near said spindle and above said disk, and with said outlet near said outside diameter of said disk.

9. The hard disk drive of claim 8, further comprising: a second disk coupled to said spindle.

10. A method of manufacturing said hard disk drive of claim 8, comprising the step:
    assembling said disk cover with said spindle motor coupled to said spindle coupled to said disk to situate said inlet near said spindle and above said disk, and to situate said outlet near said outside diameter of said disk to create said hard disk drive.

11. The hard disk drive as a product of the process of claim 10.

12. A system including at least one of said hard disk drives of claim 8.

13. The system of claim 12, wherein said system is a home entertainment system.

14. A method of making the system of claim 12, comprising the step:
    using at least one said hard disk drive to create said system.

15. The system as a product of the process of claim 14.

16. A method of cooling a hard disk drive including at least one inlet and at least one outlet in a housing of the hard disk drive, the method steps comprising:
    rotating at least one disk in said hard disk drive to generate a pressure field with a low pressure region near said inlet and a high pressure region near said outlet causing a flow of air from said outside of said hard disk drive into said inlet through said hard disk drive to said outlet for flow out of said hard disk drive.

17. The method of claim 16, wherein the step rotating said disk, further comprises the steps:
    a spindle motor drives said spindle to rotate said disk to create a rotating disk;
    said rotating disk generates said pressure field including said low pressure region near said inlet and said high pressure region near said outlet;
    said low pressure region induces air to flow through said inlet into said hard disk drive; and
    said high pressure region induces air to flow through said outlet out of said hard disk drive.

18. A hard disk drive comprising:
a housing enclosing at least one disk
at least one inlet formed in said housing
at least one outlet formed in said housing,
whereby said disk rotates in said hard disk drive, an air pressure near said inlet is lower than an air pressure near said outlet, causing said flow of air from outside said hard disk drive into said inlet through said hard disk drive to said outlet for flow out of said hard disk drive.

19. The housing of claim 18, further comprising a disk cover including said inlet.

20. The housing of claim 19, wherein said inlet is situated above said disk in said hard disk drive.

21. The housing of claim 19, wherein said disk cover further includes said outlet near an outside diameter of said disk.

22. The housing of claim 20, wherein said outlet is situated near an outside diameter of said disk.

23. The housing of claim 18, further comprising: a disk base including said outlet.

24. The housing of claim 18, wherein said inlet, includes: an inlet filter.

25. The housing of claim 18, wherein said outlet, comprises: an outlet filter.

26. The housing of claim 18, comprising at least two said inlets.

27. The housing of claim 18, comprising at least two said outlets.

28. A method of manufacturing the housing of claim 18, comprising the step:
providing said inlet and said outlet in said housing.

29. The housing as a product of the process of claim 28.

30. The hard disk drive of claim 18, comprising: said housing coupling to a spindle motor coupled through said spindle to said at least one disk;
said inlet situated near said at least one disk and near said spindle; and
said outlet situated near an outside diameter of said at least one disk.

31. A system including at least one of said hard disk drives of claim 30.

32. A method of making said hard disk drive of claim 30, comprising the step: assembling said housing with said spindle motor coupled to said spindle coupled to said disk to situate said inlet near said spindle and above said disk, and to situate said outlet near said outside diameter of said disk to create said hard disk drive.

33. The hard disk drive as a product of the process of claim 32.

* * * * *